United States Patent
Ho et al.

(10) Patent No.: US 12,093,470 B2
(45) Date of Patent: Sep. 17, 2024

(54) VIRTUAL IMAGE DISPLAY SYSTEM AND CALIBRATION METHOD FOR POINTING DIRECTION OF CONTROLLER THEREOF

(71) Applicant: HTC Corporation, Taoyuan (TW)

(72) Inventors: Chia-Chu Ho, Taoyuan (TW); Ching-Hao Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/707,958

(22) Filed: Mar. 30, 2022

(65) Prior Publication Data

US 2023/0067564 A1    Mar. 2, 2023

Related U.S. Application Data

(60) Provisional application No. 63/239,399, filed on Aug. 31, 2021.

(51) Int. Cl.
*G06F 3/033*  (2013.01)
*G06F 3/03*   (2006.01)

(52) U.S. Cl.
CPC ............ *G06F 3/033* (2013.01); *G06F 3/0304* (2013.01)

(58) Field of Classification Search
None
See application file for complete search history.

(56) References Cited

U.S. PATENT DOCUMENTS

| | | | | |
|---|---|---|---|---|
| 2007/0236451 A1* | 10/2007 | Ofek | ..................... | G06F 3/0304 345/157 |
| 2009/0009469 A1* | 1/2009 | Hsu | ...................... | G06F 3/0325 345/158 |
| 2010/0149341 A1* | 6/2010 | Marks | ..................... | A63F 13/40 348/169 |
| 2014/0062881 A1* | 3/2014 | Solomon | ............... | G06F 3/0346 345/158 |
| 2016/0148434 A1* | 5/2016 | Blonde | ................... | G06F 3/011 345/633 |

(Continued)

FOREIGN PATENT DOCUMENTS

| | | | | |
|---|---|---|---|---|
| GB | 2562245 A | * | 11/2018 | ............. G02B 27/01 |
| GB | 2582657 A | * | 9/2020 | ............ A63F 13/211 |

(Continued)

OTHER PUBLICATIONS

Hornung, et al., An Autonomous Real-Time Camera Agent for Interactive Narratives and Games, Dec. 2003, International Workshop on Intelligent Virtual Agents, pp. 77, 101 (Year: 2003).*

(Continued)

*Primary Examiner* — Kirk W Hermann
(74) *Attorney, Agent, or Firm* — JCIPRNET

(57) ABSTRACT

A virtual image display system includes a virtual image display device and a hand-held control device. The virtual image display device is coupled to the hand-held control device. The hand-held control device is configured to capture image information of the virtual image display device and analyze the image information to obtain relative angle information between the virtual image display device and the hand-held control device. The virtual image display device adjusts a pointing direction of a displayed virtual hand-held control device image according to the relative angle information.

4 Claims, 5 Drawing Sheets

(56) References Cited

U.S. PATENT DOCUMENTS

| | | | | |
|---|---|---|---|---|
| 2016/0377712 A1* | 12/2016 | Wu | ................ | G01S 13/867 |
| | | | | 342/52 |
| 2017/0206673 A1* | 7/2017 | Kawamoto | ............. | G06F 3/012 |
| 2017/0371425 A1* | 12/2017 | Cheng | ................ | G06F 3/0304 |
| 2019/0122437 A1* | 4/2019 | Pinti | ................ | G06V 10/225 |
| 2020/0089313 A1* | 3/2020 | Himane | ................ | G06F 3/016 |
| 2023/0010006 A1* | 1/2023 | Goff | ................ | G01S 19/51 |

FOREIGN PATENT DOCUMENTS

| | | | |
|---|---|---|---|
| JP | 2011242591 A | * | 12/2011 |
| TW | 201701659 | | 1/2017 |

OTHER PUBLICATIONS

"Office Action of Taiwan Counterpart Application", issued on Aug. 30, 2022, pp. 1-6.

\* cited by examiner

VIRTUAL IMAGE DISPLAY SYSTEM AND CALIBRATION METHOD FOR POINTING DIRECTION OF CONTROLLER THEREOF

CROSS-REFERENCE TO RELATED APPLICATION

This application claims the priority benefit of U.S. Provisional Application No. 63/239,399, filed on Aug. 31, 2021. The entirety of the above-mentioned patent application is hereby incorporated by reference herein and made a part of this specification.

BACKGROUND

Technical Field

The disclosure relates to a virtual image display system and a calibration method for a pointing direction of a controller thereof, and more particularly to a virtual image display system and a calibration method for a pointing direction of a controller thereof that can maintain the accuracy of manipulation actions.

Description of Related Art

A user experiencing virtual reality can perform manipulation actions in a virtual image with a control device. In the conventional art, the direction of a control cursor in a virtual image is determined by a built-in inertia measurement unit of a control device sensing movement data of a control device, and the position of the control cursor is calculated through an algorithm.

In practice, there are certain errors between the movement data sensed by the inertia measurement unit and the actual movement. Though the errors may be small, the errors generated through long-term operation are accumulated and eventually become huge enough to be noticed by the user and thus result in poor user experience.

SUMMARY

The disclosure provides a virtual image display system and a calibration method for a pointing direction of a controller thereof that can effectively improve the accuracy of the pointing direction of the controller.

The virtual image display system of the disclosure includes a virtual image display device and a hand-held control device. The hand-held control device is coupled to the virtual image display device. The hand-held control device is configured to capture image information of the virtual image display device and analyze the image information to obtain relative angle information between the virtual image display device and the hand-held control device. The virtual image display device adjusts a pointing direction of a displayed virtual hand-held control device image according to the relative angle information.

The calibration method for a pointing direction of a controller in the disclosure is adapted for a virtual image display system. The calibration method for the pointing direction includes the following steps. A hand-held control device as the controller captures image information of a virtual image display device. The hand-held control device analyzes the image information to obtain relative angle information between the virtual image display device and the hand-held control device. The virtual image display device adjusts a pointing direction of a displayed virtual hand-held control device image according to the relative angle information.

Based on the above, the virtual image display system of the disclosure captures the image information of the virtual image display device by the hand-held control device and obtains the actual relative angle information between the virtual image display device and the hand-held control device according to the image information of the virtual image display device. In this way, the virtual image display device may use the relative angle information to calibrate the pointing direction of the displayed virtual hand-held control device image, maintain the correctness of the pointing direction of the virtual hand-held control device image, and further maintain the accuracy of manipulation actions performed by the hand-held control device.

DESCRIPTION OF THE EMBODIMENTS

Figure 1:
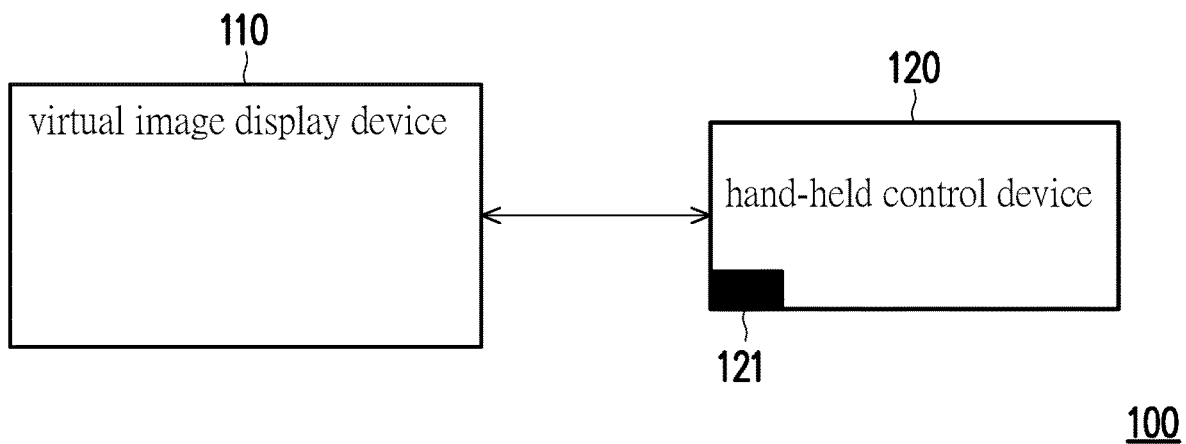
FIG. 1 is a schematic diagram of a virtual image display system according to an embodiment of the disclosure.

Please refer to FIG. 1. FIG. 1 is a schematic diagram of a virtual image display system according to an embodiment of the disclosure. A virtual image display system 100 includes a virtual image display device 110 and a hand-held control device 120. The virtual image display device 110 and the hand-held control device 120 are coupled to each other.

The hand-held control device 120 may generate a control cursor in a virtual image displayed by the virtual image display device 110 with a pointing direction. In this way, a user may perform manipulation actions in the virtual world of the virtual image display device 110 with the control cursor through the hand-held control device 120.

On the other hand, the hand-held control device 120 has an image capturing device 121, and the image capturing device 121 may be configured to capture an image of the virtual image display device 110. The image capturing direction of the image capturing device 121 may be the same as the pointing direction provided by the hand-held control device 120, or the image capturing direction of the image capturing device 121 and the pointing direction provided by the hand-held control device 120 may keep a fixed angle difference.

Figure 2:
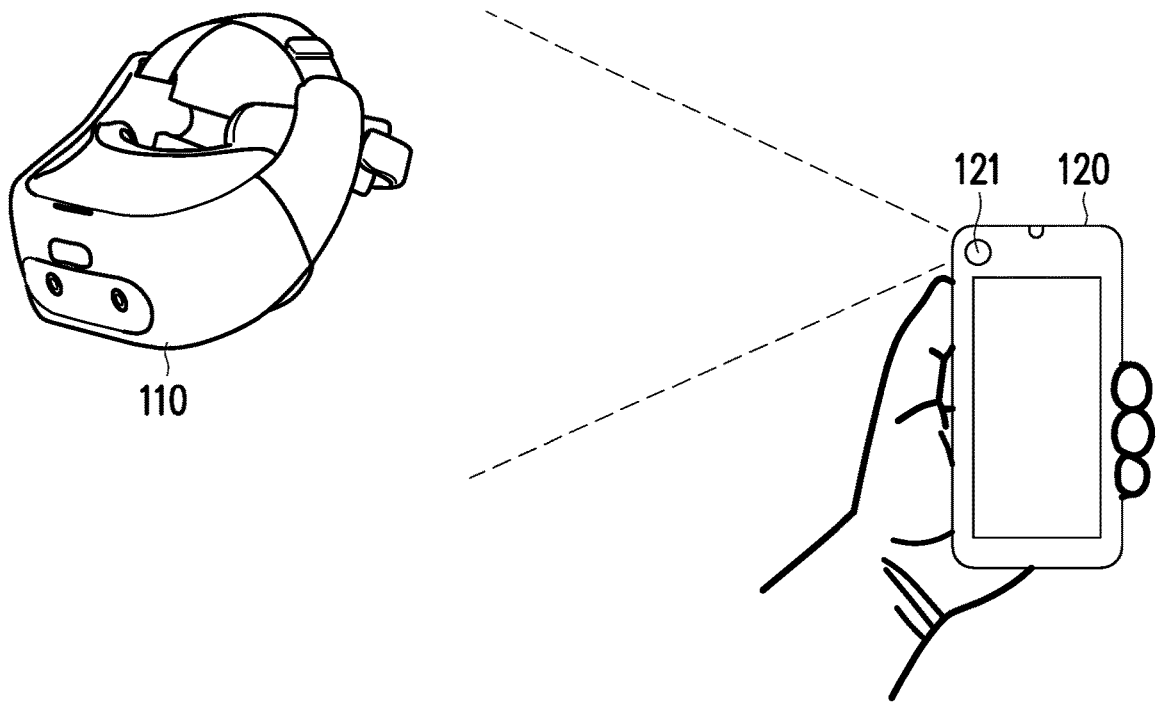
FIG. 2 is a schematic diagram of a calibration action of the virtual image display system according to the embodiments of the disclosure.

When the pointing direction of the hand-held control device 120 is calibrated, please refer to FIG. 2, a schematic diagram of a calibration action of the virtual image display system according to the embodiments of the disclosure. The hand-held control device 120 may be, for example, a smartphone and may capture image information of the virtual image display device 110 by the image capturing device 121. The image information herein may be a static picture or a dynamic video, and the image capturing device 121 may be any form of a camera or a video camera without certain limitation.

Furthermore, the hand-held control device 120 may use a built-in processor to analyze the image information of the virtual image display device 110 to obtain relative angle information between the virtual image display device 110 and the hand-held control device 120.

The hand-held control device 120 may transmit the obtained relative angle information to the virtual image display device 110. The virtual image display device 110 may adjust the pointing direction of the displayed virtual hand-held control device image according to the obtained relative angle information.

In this embodiment, the hand-held control device 120 may also be any hand-held device having the image capturing device 121 and a processor with computing capability, which is not necessary to be a smartphone. The virtual image display device 110 may be any display device capable of providing virtual reality, augmented reality, and/or mixed reality experience, such as a head-mounted display.

Figure 3A:
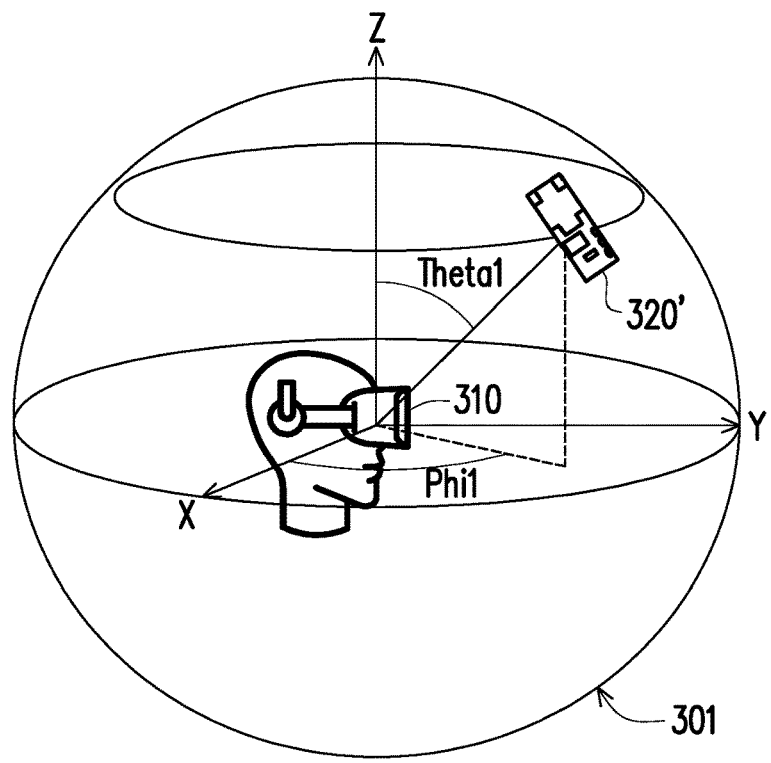
FIG. 3A and FIG. 3B are schematic diagrams of operations of the virtual image display system.
Figure 3B:
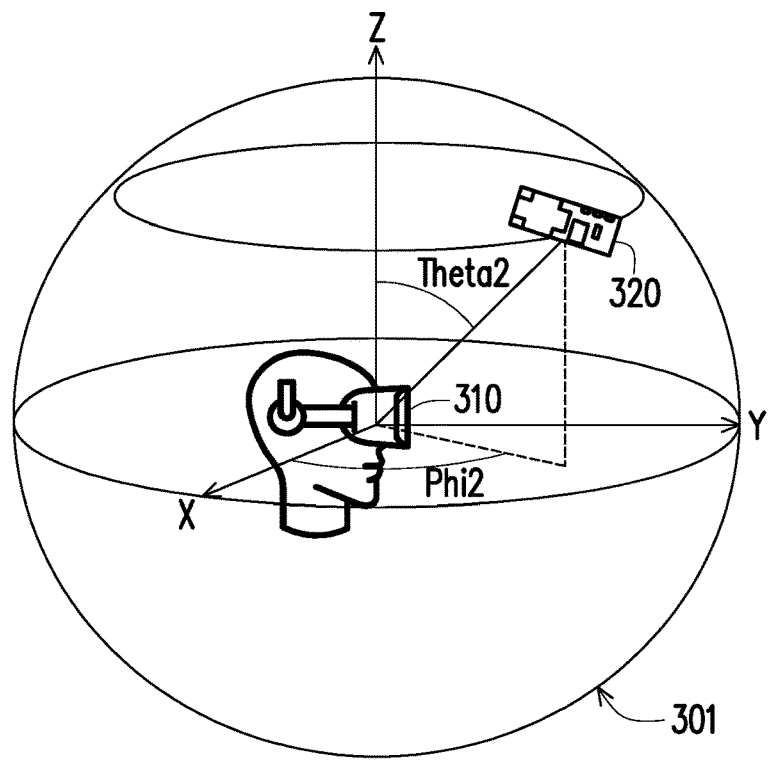

For details of the actions of the virtual image display system, please refer to FIG. 3A and FIG. 3B, which are schematic diagrams of operations of the virtual image display system. In FIG. 3A and FIG. 3B, the virtual image display system includes a virtual image display device 310 and a hand-held control device 320. The virtual image display device 310 and the hand-held control device 320 (see FIG. 3B) may be coupled to each other in a wired or wireless manner. In this embodiment, the virtual image display device 310 may be a head-mounted display device, and the hand-held control device 320 may be a smartphone.

Initially, the virtual image display device 310 may display a virtual hand-held control device image 320' corresponding to the hand-held control device 320 according to preset first angle information, making the virtual hand-held control device image 320' have an initial pointing direction. The first angle information includes a first included angle Theta1 between the virtual hand-held control device image 320' and a first axis (e.g., the Z axis) and a second angle Phi1 between the virtual hand-held control device image 320' and a second axis (e.g., the X axis) in a spherical coordinate system 301. In addition, the virtual image display device 310 may be fixed at the origin of the spherical coordinate system 301, and the pointing direction of the virtual image display device 310 may be set to be parallel to a third axis (e.g., the Y axis) of the spherical coordinate system 301.

In this embodiment, the first axis, the second axis, and the third axis of the spherical coordinate system 301 are orthogonal to each other.

During the operation of the virtual image display system, a user may perform manipulation actions to the virtual image display device 310 through the hand-held control device 320. The hand-held control device 320 may calculate the control cursor movement generated by the hand-held control device 320 through a built-in inertia measurement unit (IMU). The virtual image display device 310 may generate the current pointing direction of the virtual hand-held control device image 320' according to the movement of the control cursor and adjust the position of the displayed virtual hand-held control device image 320'.

Figure 4:
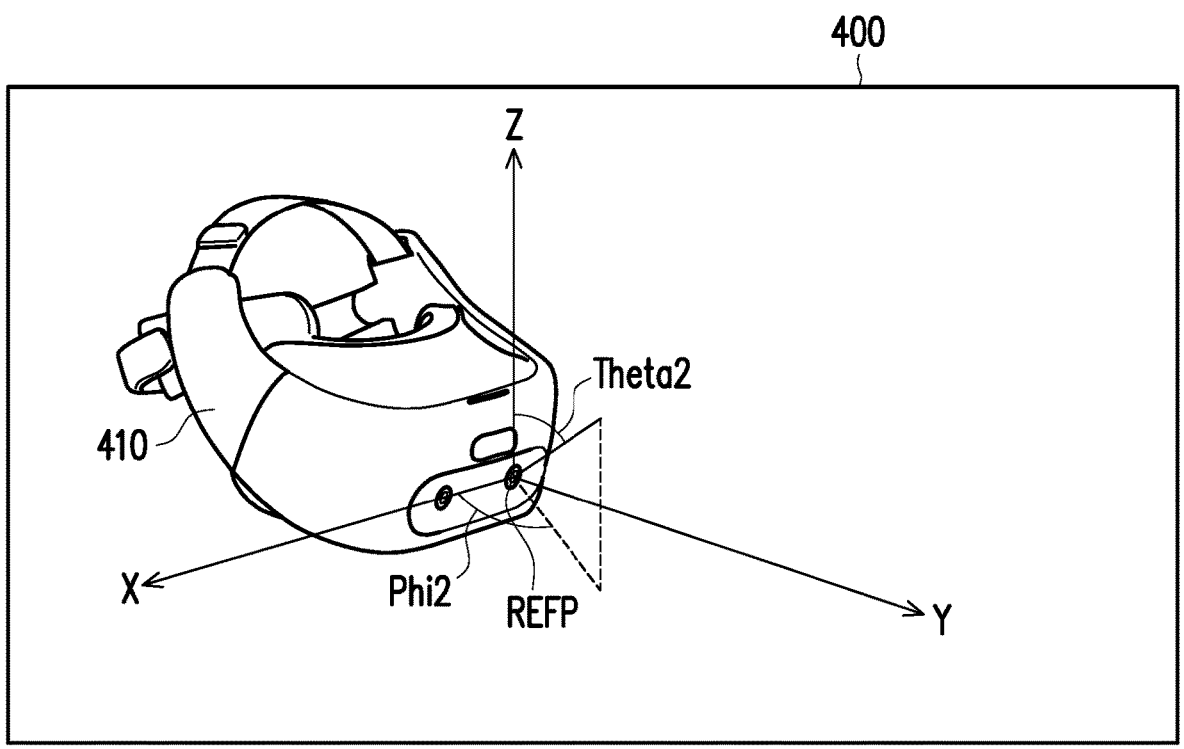
FIG. 4 is a schematic diagram of a method of obtaining relative angle information between a virtual image display device and a hand-held control device according to the embodiments of the disclosure.

When the calibration action is performed, in FIG. 3B, the hand-held control device 320 may perform an image capturing action to the virtual image display device 310 and obtain image information of the virtual image display device 310, with reference to FIG. 3B and FIG. 4, a schematic diagram of a method of obtaining relative angle information between the virtual image display device and the hand-held control device according to the embodiments of the disclosure. Image information 400 of the virtual image display device 310 includes an image 410 of the virtual image display device 310. The hand-held control device 320 may analyze the image 410 of the virtual image display device 310 and establish the spherical coordinate system 301 according to the direction of the image 410 of the virtual image display device 310. The hand-held control device 320 may set a reference point REFP in the image 410 as the origin of the spherical coordinate system 301, set the Y axis of the spherical coordinate system 301 according to the pointing direction presented by the image 410, and set the X axis of the spherical coordinate system 301 according to the horizontal direction presented by the image 410. Furthermore, the hand-held control device 320 sets the Z axis of the spherical coordinate system 301 according to the vertical direction presented by the image 410.

Since the image information 400 is established based on the viewing angle of the image capturing device of the hand-held control device 320, and there is a fixed angle difference between the pointing direction of the hand-held control device 320 and the viewing angle of the image capturing device, the hand-held control device 320 may calculate relative angle information between the virtual image display device 310 and the hand-held control device 320. The relative angle information includes an included angle Theta2 between the hand-held control device 320 and the Z axis and an included angle Phi2 between the hand-held control device 320 and the X axis.

The relative angle information including the included angle Theta2 and the included angle Phi2 may be transmitted to the virtual image display device 310. The virtual image display device 310 may calculate the relative relationship between the relative angle information and the first angle information for displaying the virtual hand-held control device image 320' to obtain a pointing angle offset value. In this way, the virtual image display device 310 may adjust the current pointing direction of the displayed virtual hand-held control device image 320' to a calibrated pointing direction according to the pointing angle offset value.

In the embodiments of the disclosure, calibration actions may be performed periodically, which means the accumulated errors of the control cursor generated by the hand-held control device 320 may be eliminated periodically through the calibration actions to ensure the accuracy of the control cursor position and improve the user experience of the virtual image display system.

Figure 5:
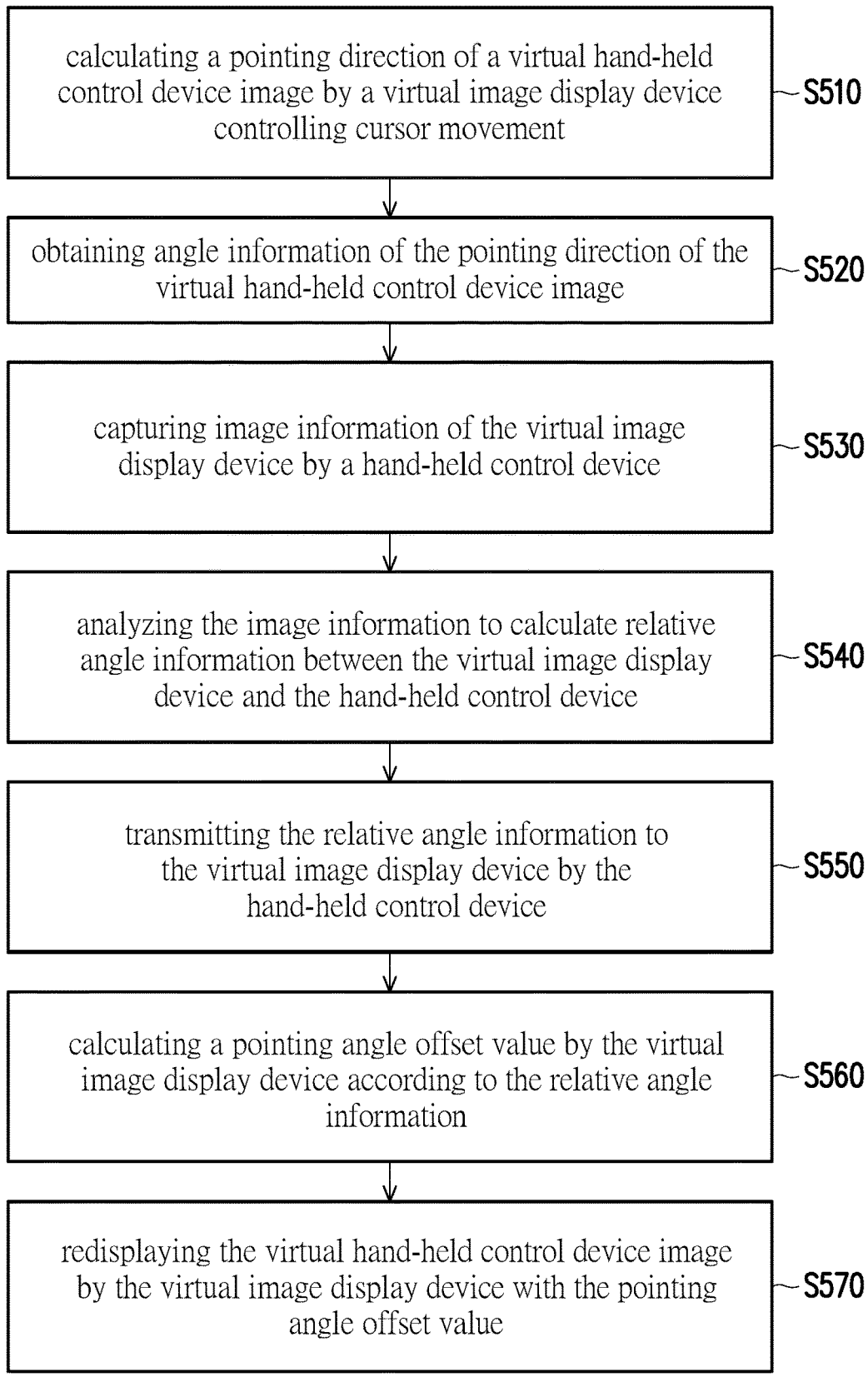
FIG. 5 is an action flow chart of the virtual image display system according to the embodiments of the disclosure.
Figure 6:
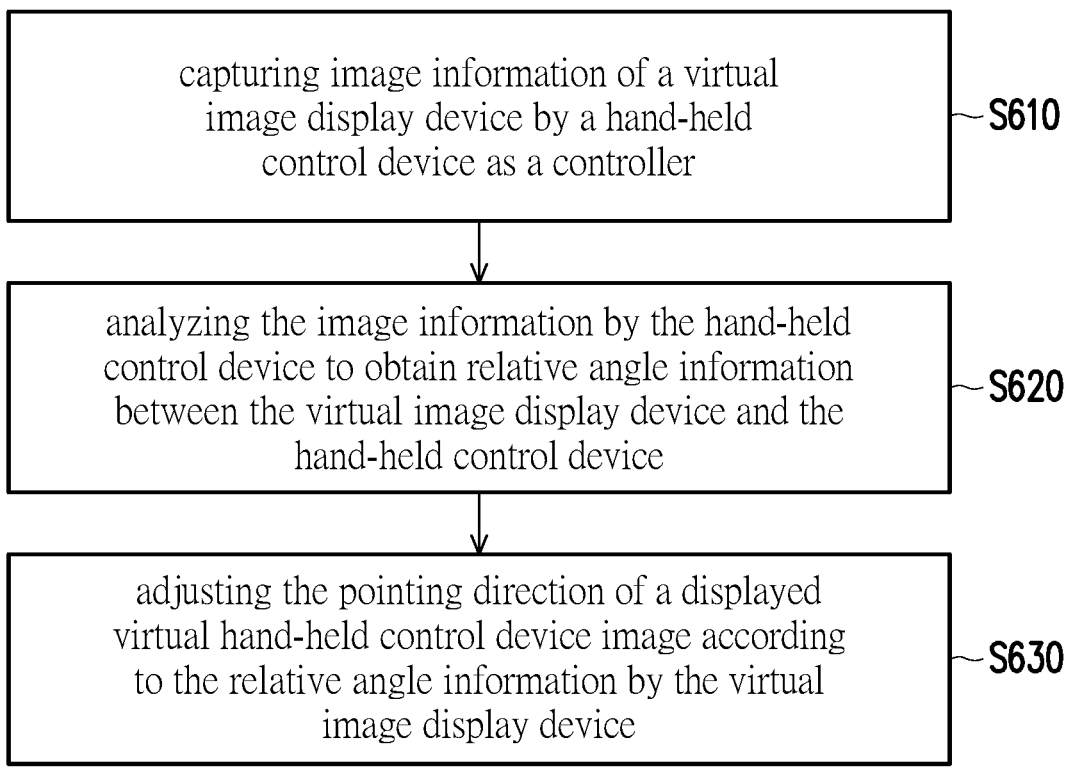
FIG. 6 is an action flow chart of a calibration method for a pointing direction of a controller adapted for the virtual image display system according to the embodiments of the disclosure.

Please refer to FIG. 5. FIG. 5 is an action flow chart of the virtual image display system according to the embodiments of the disclosure. In step S510, the virtual image display device calculates the pointing direction of the virtual hand-held control device according to the control cursor movement. In step S520, the virtual image display device obtains the angle information of the pointing direction of the virtual hand-held control device image. In step S530, the hand-held control device captures the image information of the virtual image display device. In step S540, the hand-held control device analyzes the image information to calculate the relative angle information between the virtual image display device and the hand-held control device. Next, in step S550, the hand-held control device transmits the relative angle information to the virtual image display device. In step S560, the virtual image display device calculates the pointing angle offset value according to the relative angle information. in step S570, with the pointing angle offset value, the virtual image display device redisplays the virtual hand-held control device image and completes a calibration action of the control cursor. Please refer to FIG. 6. FIG. 6 is an action flow chart of a calibration method for a pointing direction of a controller adapted for the virtual image display system according to the embodiments of the disclosure. In a calibration action, in step S610, the hand-held control device as the controller captures the image information of the virtual image display device. Next, in step S620, the hand-held control device analyzes the image information to obtain the relative angle information between the virtual image display device and the hand-held control device. In step S630, the virtual image display device adjusts the pointing direction of the displayed virtual hand-held control device image according to the relative angle information.

Implementation details of the above steps S610 to S630 have been explained elaborately in the multiple embodiments above, and details are not described herein.

In summary, the virtual image display system of the disclosure, through the periodically performed calibration actions in which the hand-held control device captures the image of the virtual image display device and analyzes the image information of the virtual image display device, performs the calibration actions of the pointing direction of the displayed virtual hand-held control device. In this way, the accumulated errors of the control cursor can be eliminated to improve the accuracy of manipulation by users experiencing virtual reality.

What is claimed is:

1. A calibration method for a pointing direction of a controller, adapted for a virtual image display system, comprising:
    setting an initial pointing direction of a virtual hand-held control device image that is displayed on a virtual image display device according to first angle information by the virtual image display device;
    generating a pointing direction of the virtual hand-held control device image according to control cursor movement generated by a hand-held control device being the controller;
    in a normal mode, calculating a control cursor movement generated by the hand-held control device through a built-in inertia measurement unit in the hand-held control device, and adjusting the pointing direction of the virtual hand-held control device image according to the control cursor movement and a pointing angle offset value by the virtual image display device;
    in a calibration mode, capturing image information of the virtual image display device by the hand-held control device;
    in the calibration mode, analyzing the image information by the hand-held control device to obtain relative angle information between the virtual image display device and the hand-held control device, further comprising:
        analyzing the image information by the hand-held control device to obtain a first pointing direction of the hand-held control device and a second pointing direction of the virtual image display device;
        calculating an angle difference between the first pointing direction and the second pointing direction by the hand-held control device to obtain the relative angle information; and
    setting the second pointing direction of the virtual image display device to be parallel to a first axis of a spherical coordinate system; and
    in the calibration mode, calculating the pointing angle offset value according to a relative relationship between the relative angle information and the first angle information by the virtual image display device and adjusting the pointing direction of the virtual hand-held control device image that is displayed on the virtual image display device to a calibrated pointing direction according to the pointing angle offset value by the virtual image display device.

2. The calibration method for the pointing direction according to claim 1, wherein the relative angle information comprises a first included angle with a second axis of the spherical coordinate system and a third included angle with the second axis of the spherical coordinate system, and the second axis and a third axis of the spherical coordinate system are different.

3. A virtual image display system, comprising:
    a virtual image display device; and
    a hand-held control device, coupled to the virtual image display device, wherein the hand-held control device, in a calibration mode, is configured to:
    capture image information of the virtual image display device; and
    analyze the image information to obtain relative angle information between the virtual image display device and the hand-held control device,
    wherein in a normal mode, the hand-held control device calculates a control cursor movement generated by the hand-held control device through a built-in inertia measurement unit, and the virtual image display device sets an initial pointing direction of a virtual hand-held control device image that is displayed according to first angle information, and adjusts a pointing direction of the virtual hand-held control device image according to the control cursor movement and a pointing angle offset value; and
    in the calibration mode, the virtual image display device calculates the pointing angle offset value according to a relative relationship between the relative angle information and the first angle information, and adjusts the pointing direction of the virtual hand-held control device image that is displayed to a calibrated pointing direction according to the pointing angle offset value,
    wherein the hand-held control device analyzes the image information to obtain a first pointing direction of the hand-held control device and a second pointing direction of the virtual image display device, and the hand-held control device calculates an angle difference between the first pointing direction and the second pointing direction to obtain the relative angle information,
    wherein the second pointing direction of the virtual image display device is set to be parallel to a first axis of a spherical coordinate system.

4. The virtual image display system according to claim 3, wherein the relative angle information comprises a first included angle with a second axis of the spherical coordinate system and a second included angle with a third axis of the spherical coordinate system, and the second axis and the third second axis of the spherical coordinate system are different.

* * * * *